United States Patent
Kong et al.

(10) Patent No.: US 7,436,581 B2
(45) Date of Patent: Oct. 14, 2008

(54) APPARATUS AND METHOD FOR SELF-PHASE CONTROL WITH STIMULATED BRILLOUIN SCATTERING PHASE CONJUGATE MIRROR

(75) Inventors: Hong-Jin Kong, Daejeon (KR);
Seong-Ku Lee, Jeonnam (KR);
Dong-Won Lee, Daejeon (KR);
Nakatsuka Masahiro, Nara (JP)

(73) Assignee: Korea Advanced Institute of Science and Technology (KAIST), Daejeon (KR)

( * ) Notice: Subject to any disclaimer, the term of this patent is extended or adjusted under 35 U.S.C. 154(b) by 143 days.

(21) Appl. No.: 10/570,838

(22) PCT Filed: Dec. 29, 2003

(86) PCT No.: PCT/KR03/02870

§ 371 (c)(1),
(2), (4) Date: Mar. 3, 2006

(87) PCT Pub. No.: WO2005/022234

PCT Pub. Date: Mar. 10, 2005

(65) Prior Publication Data

US 2007/0053393 A1    Mar. 8, 2007

(30) Foreign Application Priority Data

Sep. 3, 2003    (KR) .................... 10-2003-0061528

(51) Int. Cl.
*H01S 4/00* (2006.01)
*H01S 3/139* (2006.01)
(52) U.S. Cl. ..................................... 359/334
(58) Field of Classification Search .................. 359/334
See application file for complete search history.

(56) References Cited

U.S. PATENT DOCUMENTS 3,842,367 A * 10/1974 Schlossberg ............... 372/32

(Continued)

FOREIGN PATENT DOCUMENTS

KR    100149771    6/1998

(Continued)

OTHER PUBLICATIONS

Kong et al, "Beam Combination Using Stimulated Brillouin Scattering Phase Conjugate Mirror for Laser Fusion Driver", Journal of the Korean Physcial Society, vol. 49, Dec. 2006, pp. S39-S42.*

*Primary Examiner*—Eric Bolda
(74) *Attorney, Agent, or Firm*—Mayer & Williams PC; Stuart H. Mayer, Esq.

(57) ABSTRACT

A method for controlling phases of beams to make relative phases of the beams "0" in a beam splitting amplification laser using a stimulated Brillouin scattering phase conjugate mirror. A procedure of making a phase difference between laser beams reflected from the phase conjugate mirror "0" comprises a first step of inputting laser beams reflected from the phase conjugate mirrors to a light detector through light path converter a second step of using one of the reflected laser beams as a reference laser beam and making the reference laser beam interfere with another reflected laser beam; and a third step of detecting the interference result and finely driving piezoelectric element to control the positions of the reflectors, to thereby make a phase difference between the become "0".

3 Claims, 8 Drawing Sheets

U.S. PATENT DOCUMENTS

| | | | | |
|---|---|---|---|---|
| 4,794,605 A | | 12/1988 | Aprahamian et al. | 372/9 |
| 5,208,699 A | | 5/1993 | Rockwell et al. | 359/338 |
| 5,293,272 A | * | 3/1994 | Jannson et al. | 359/1 |
| 5,832,020 A | * | 11/1998 | Kong | 372/72 |
| 5,974,060 A | * | 10/1999 | Byren et al. | 372/19 |
| 6,385,228 B1 | * | 5/2002 | Dane et al. | 372/99 |

FOREIGN PATENT DOCUMENTS

| | | |
|---|---|---|
| KR | 1020000050976 | 8/2000 |

\* cited by examiner

FIG. 1

PRIOR ART

FIG. 2

PRIOR ART

FIG. 3

PRIOR ART

APPARATUS AND METHOD FOR SELF-PHASE CONTROL WITH STIMULATED BRILLOUIN SCATTERING PHASE CONJUGATE MIRROR

TECHNICAL FIELD

The present invention relates to an apparatus and a method for controlling phases of beams to make relative phases of the beams "0" in a beam splitting amplification laser using a stimulated Brillouin scattering phase conjugate mirror (SBS-PCM).

BACKGROUND ART

An SBS-PCM reflects a phase conjugation wave to compensate a distortion of a laser beam, generated during a laser amplification process, so that it can be easily applied to a beam splitting high-power laser. The beam splitting amplification laser using the SBS-PCM is disclosed in U.S. Pat. No. 5,832,020A and Korean Patent No. 1003185200000.

Figure 1:
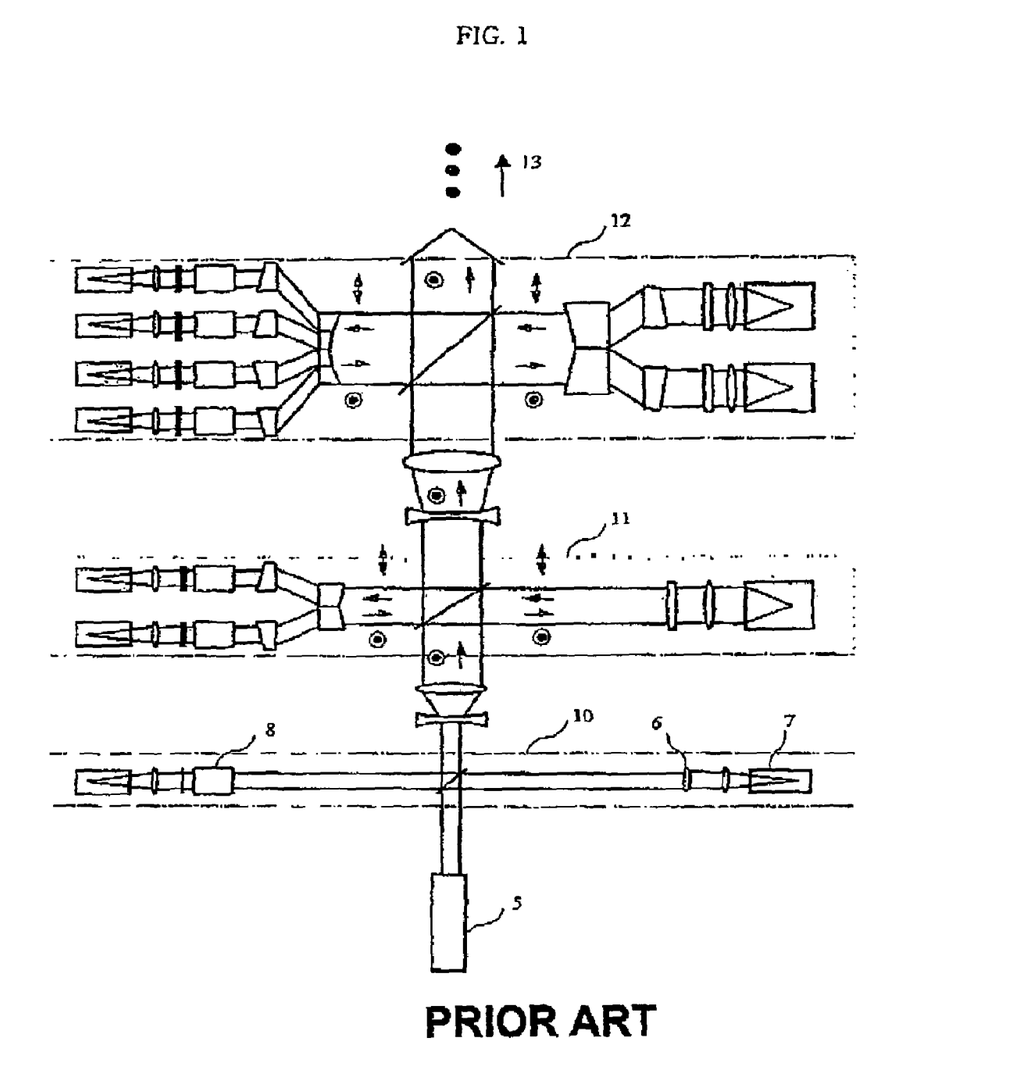
FIG. 1 is a schematic diagram of a conventional beam splitting amplification system using an SBS-PCM.

FIG. 1 is a schematic diagram of a beam splitting amplification laser. which is disclosed in detail in Korean Patent Application No. 10-1999-00011876. The prior art beam splitting amplification laser shown in FIG. 1 provides a light interrupter that prevents a part of a laser beam that is emitted from a laser beam generator and passed through optical elements of a system from inputting to the laser beam generator again to damage the laser beam generator. FIG. 1 is a schematic diagram for explaining splitting and amplification of a laser beam. Referring to FIG. 1, a laser beam emitted from a laser source 5 is amplified through beam amplification stages 10, 11, 12, . . . . The amplified laser beam 13 is provided to a system that requires the laser beam.

If a part of the laser beam is reflected and input to the laser source 5 again, the laser source 5 is damaged. To prevent this, the prior art arranges a ¼ phase plate 6, an SBS-PCM 7 and an optical amplifier 8 and uses polarization to block the beam input to the light source.

In the above-described beam splitting amplifier, laser beams split by each beam splitter are reflected from each SBS-PCM and recombined if required. If the recombined laser beams have a phase difference of 180 degrees therebetween, the central intensity in the spatial distribution of the recombined laser beams becomes "0" to deteriorate the spatial distribution of the laser beams. Thus, a high-quality laser beam cannot be obtained.

The laser beams reflected from the phase conjugation mirrors have different phases because the stimulated Brillouin scattering occurs at different positions of the phase conjugation mirrors. Accordingly, laser beams reflected from different phase conjugation mirrors have different phases and, when these laser beams are recombined, the central intensity of the recombined beams is different from the peripheral intensity. To obtain a high-quality laser beam having a uniform spatial distribution of a combined laser beam, it is required to control phases of laser beams reflected according to the stimulated Brillouin scattering to make relative phases of the laser beams "0".

To solve the aforementioned problem, studies have been carried out in various ways.

Figure 2:
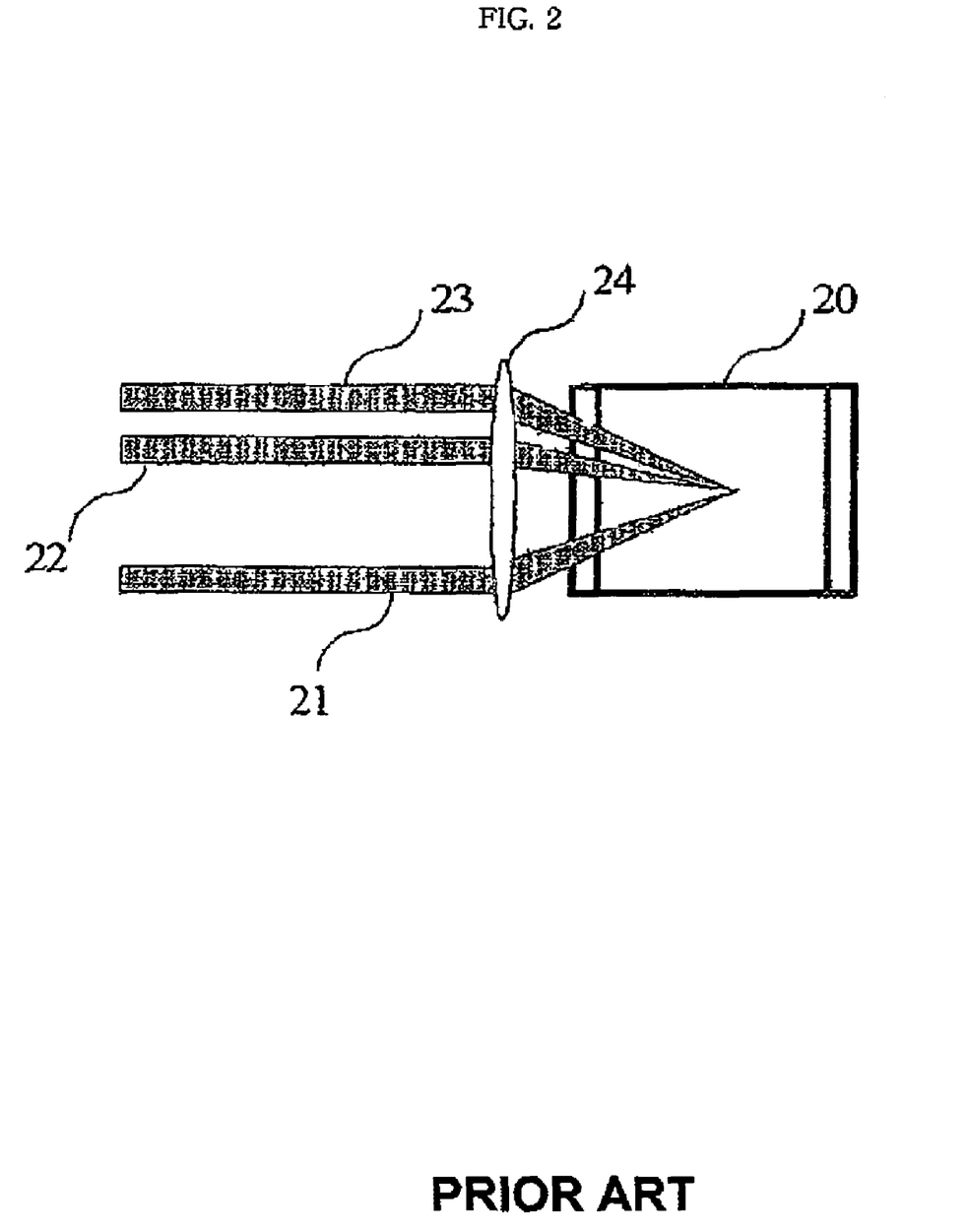
FIG. 2 is a schematic diagram showing a conventional phase locking method according to focus overlapping using an SBS-PCM.

FIG. 2 is a schematic diagram showing a method of controlling phases of laser beams according to focus overlapping using an SBS-PCM to lock the phases. This method focuses a plurality of laser beams 21, 22 and 23 on a single SBS-PCM 20 through a lens 24 so as to superpose the multiple laser beams on one focus. In this case, the multiple laser beams are reflected from the same position according to scattering so that they have the same phase. However, this method has the following problems.

First of all, since the multiple laser beams must be focused on a single phase conjugation mirror in order to amplify the laser beams, a stimulated Brillouin scattering medium loses its function or presents non-linearity in the case of a high incident energy. This remarkably reduces reflectivity and phase conjugation degree. A beam recombination amplification system is used to obtain a high-energy laser beam. The above-described focus overlapping phase locking method is difficult to use when the incident energy exceeds the energy that the medium of the phase conjugate mirror can stably reflect. Furthermore, the laser beams should be arranged such that their focuses are overlapped on one phase conjugate mirror. Thus, as the number of laser beams increases, the laser beams become difficult to arrange. Moreover, the number of the laser beams is spatially restricted. Accordingly, an output energy is also restricted so that a high-power energy cannot be obtained.

Figure 3:
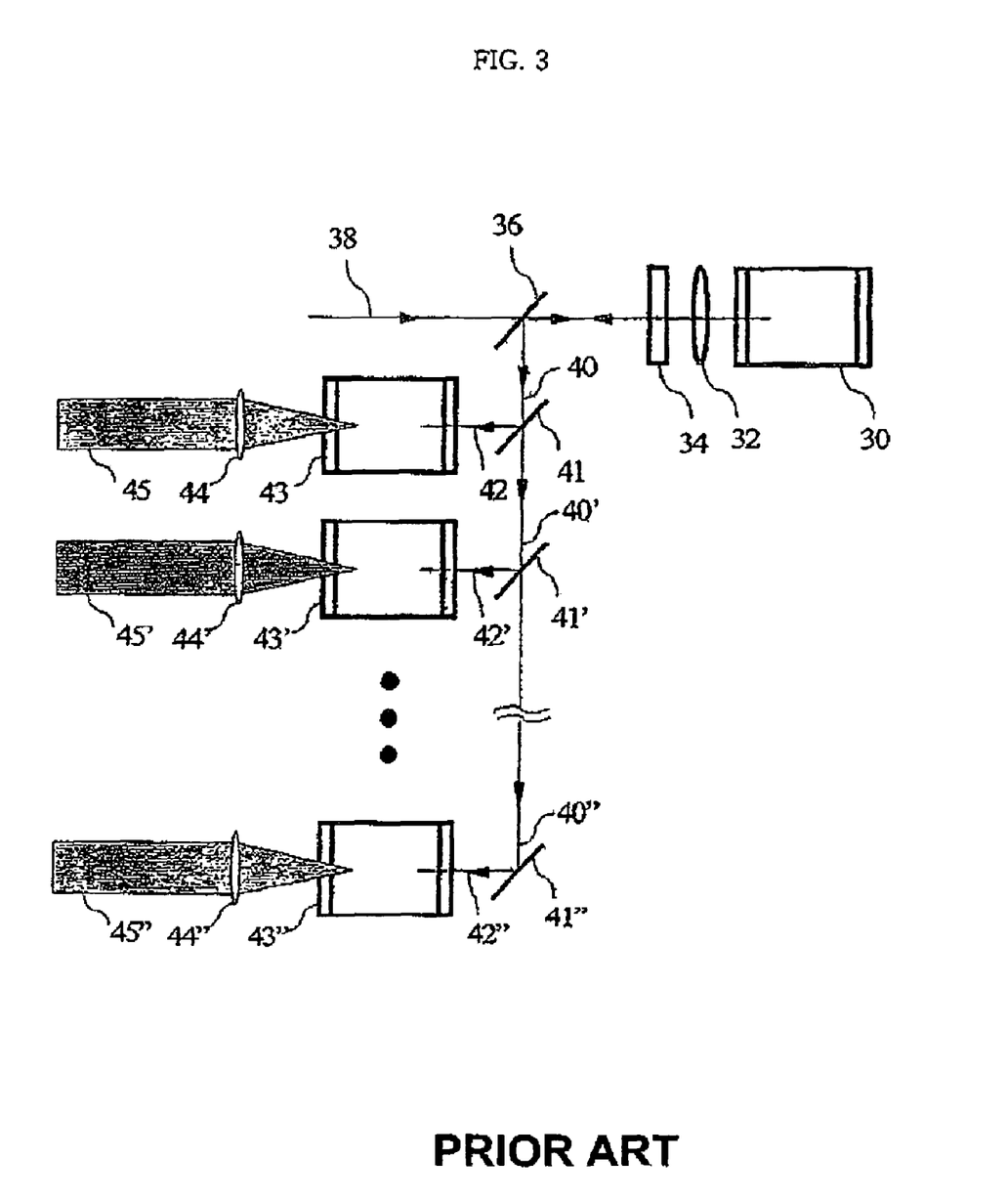
FIG. 3 is a schematic diagram showing a conventional phase locking method according to a stokes wave back seeding using an SBS-PCM.

FIG. 3 is another method for making a phase difference between split laser beams "0". This method is a phase locking technique according to stokes wave back seeding using a conventional SBS-PCM. Here, the stokes wave means a laser beam having the same frequency as that of a reflected wave that is reflected according to the stimulated Brillouin scattering. This technique inputs a laser beam to be reflected to the front side of a phase conjugate mirror and, simultaneously, seeds a laser beam at the back of the phase conjugate mirror. In this case, a stokes wave input to the back side of the phase conjugate mirror is amplified so that the effect as if the incident beam is reflected is obtained.

In FIG. 3, when an incident laser beam 38 passes through a polarization beam splitter 36 and a Faraday rotator 34, polarization of the incident laser beam is rotated by 45 degrees. Then, when the laser beam is reflected from a phase conjugate mirror 30 and passed through the Faraday rotator 34 again, its polarization is rotated by 45 degrees again. As a result, the reflected laser beam 32 has polarization that is rotated by 90 degrees with respect to the polarization of the incident laser beam 38. A laser beam 40 reflected by the polarization beam splitter 36 is identical to the laser beam reflected by the phase conjugate mirror 30 so that the laser beam 40 becomes a stokes wave having a frequency lower than that of the incident laser beam 38 and it can be used as a seeding beam. When laser beams 45, 45' and 45" to be reflected are respectively input to the front sides of the phase conjugate mirrors 43, 43' and 43" and, simultaneously, the seeding beam 40 is split into beams 42, 42' and 42" using beam splitters 41, 41' and 41" and input to the back sides of the phase conjugate mirrors 43, 43' and 43", respectively, the seeding beams 42, 42' and 42" can be used for phase-locking the amplified laser beams 45, 45' and 45". Here, it is possible to make a phase difference among the seeding beams 42, 42' and 42" become "0" in order to make a phase difference among the reflected laser beams 45, 45' and 45" "0" by controlling the positions of the beam splitters 41, 41 ' and 41".

When the same stokes wave is seeded in the stimulated Brillouin scattering medium, the same stokes wave is amplified so that the phases of the beams reflected from the SBS-PCMs are locked. However, the phase locking technique according to the stokes wave back seeding has the following problem. First of all, a structural arrangement of a system for carrying out the technique is complicated because the back seeding stokes wave should be generated and passed through focuses. That is, beams reflected from the SBS-PCMs should be back-seeded and, when there are many split beams, all of the split beams require back seeding. To avoid this, only a part of the incident beam is back-seeded. In this case, however, the incident beam must have a wide frequency band and include the frequency of the stokes wave. However, this may deteriorate the quality and performance of reflected beams when the fact that the stimulated Brillouin scattering occurs well when a frequency width is small is considered. Even in this case, the structural arrangement becomes complicated and difficult as the number of split beams increases.

DISCLOSURE OF INVENTION

Accordingly, the present invention provides a method and an apparatus for controlling phases of beams reflected by scattering in SBS-PCMs.

The method controls the position of scattering that occurs at a phase conjugate mirror so as to control the phases of the beams. For this, the present invention provides a reflector and a fine displacement controller behind the SBS-PCM and reflects a laser beam, which has passed through the phase conjugate mirror, through the reflector to input the reflected laser beam to the phase conjugate mirror again, to thereby control the position at which scattering occurs.

BRIEF DESCRIPTION OF THE DRAWINGS

Further objects and advantages of the invention can be more fully understood from the following detailed description taken in conjunction with the accompanying drawings, in which.

BEST MODE FOR CARRYING OUT THE INVENTION

The present invention will now be described in detail in connection with preferred embodiments with reference to the accompanying drawings. For reference, like reference characters designate corresponding parts throughout several views.

First of all, a procedure and a position of generation of scattering in an SBS-PCM are explained.

When a reflector is located behind a phase conjugate mirror and laser beams are input to the front side of the phase conjugate mirror, a beam that is input to the phase conjugate mirror before stimulated Brillouin scattering occurs passes through the phase conjugate mirror and then reflected from the reflector to be input to the phase conjugate mirror. Accordingly, the laser beams are input to both sides of the phase conjugate mirror. Here, the laser beams input to both sides of the phase conjugate mirror have the same frequency but they are propagated in directions opposite to each other. Thus, the laser beams meet at an arbitrary position in the phase conjugate mirror so that a spatially fixed standing wave is generated. Owing to the standing wave, the internal density of the phase conjugate mirror has a form in which the density is periodically high or low over a predetermined section. The form of the internal density is also spatially fixed similarly to the standing wave. Because the stimulated Brillouin scattering occurs at a point having a high density, it is possible to control the position of generation of the standing wave to control phases of laser beams reflected according to the stimulated Brillouin scattering in the phase conjugate mirror. As described above, the position of generation of the standing wave is affected by the beams that are input to the phase conjugate mirror according to the reflector. Therefore, the position of generation of the standing wave can be controlled and, accordingly, the phases of the reflected laser beams can be controlled by adjusting a relative distance between the phase conjugate mirror and the reflector.

A procedure of applying a system, which varies the relative distance between the phase conjugate mirror and the reflector to determine phases of reflected laser beams, to a beam splitting amplifier is explained with reference to FIGS. 4 to 8.

Figure 4:
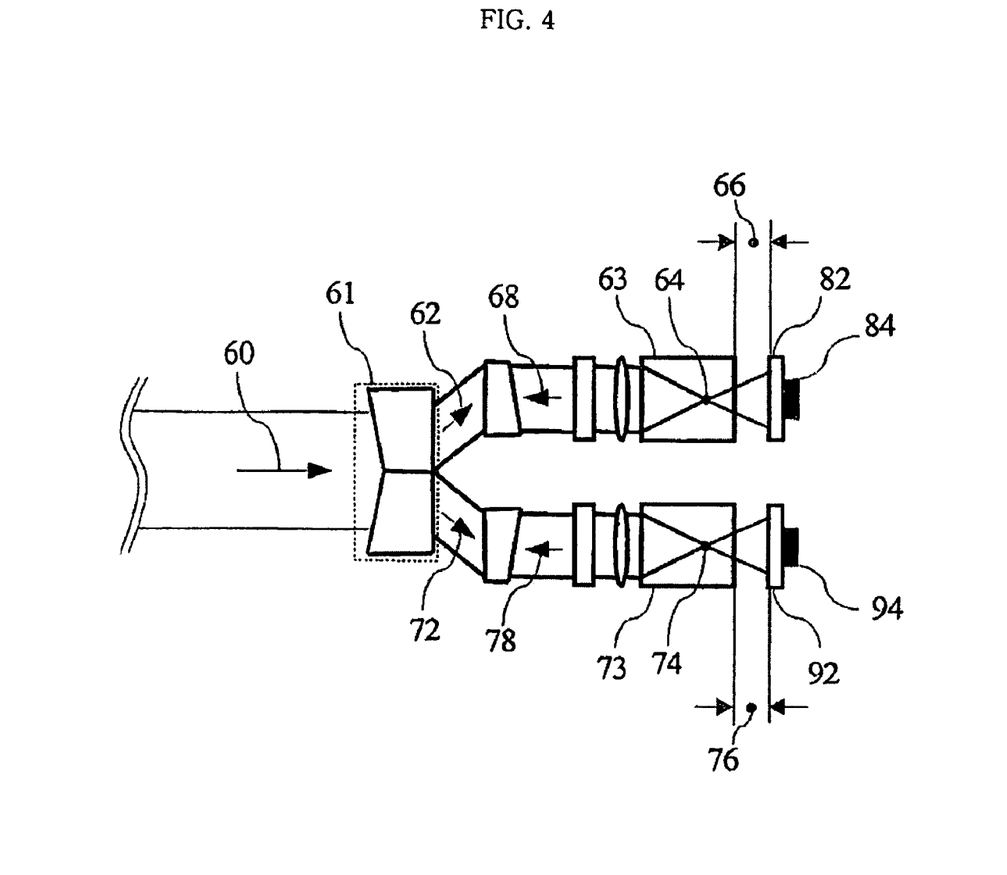
FIG. 4 is a schematic diagram showing an embodiment in which a system of determining a phase of a reflected laser beam is applied to a beam splitting amplifier.

FIG. 4 is a schematic diagram showing an embodiment in which the system of determining phases of reflected laser beams is applied to a beam splitting amplifier. Referring to FIG. 4, to amplify a laser beam 60, the laser beam 60 is split into two incident laser beams 62 and 72 and the split laser beams 62 and 72 are respectively input to phase conjugate mirrors 63 and 73. The incident laser beams 62 and 72 are respectively reflected at points 64 and 74 where scattering occurs in the phase conjugate mirrors, to generate reflected laser beams 68 and 78 that are propagated in a direction opposite to the direction of the incident laser beams. Here, though phases of the two reflected laser beams 68 and 78 are not changed but locked, the phases are not identical to each other because the reflected laser beams 68 and 78 are respectively reflected from the phase conjugate mirrors. Thus, a phase difference between the two reflected laser beams is not "0". Accordingly, when the reflected laser beams are recombined, destructive interference or constructive interference occurs due to the phase difference. If the destructive interference occurs, a high-quality laser beam cannot be obtained.

Figure 5:
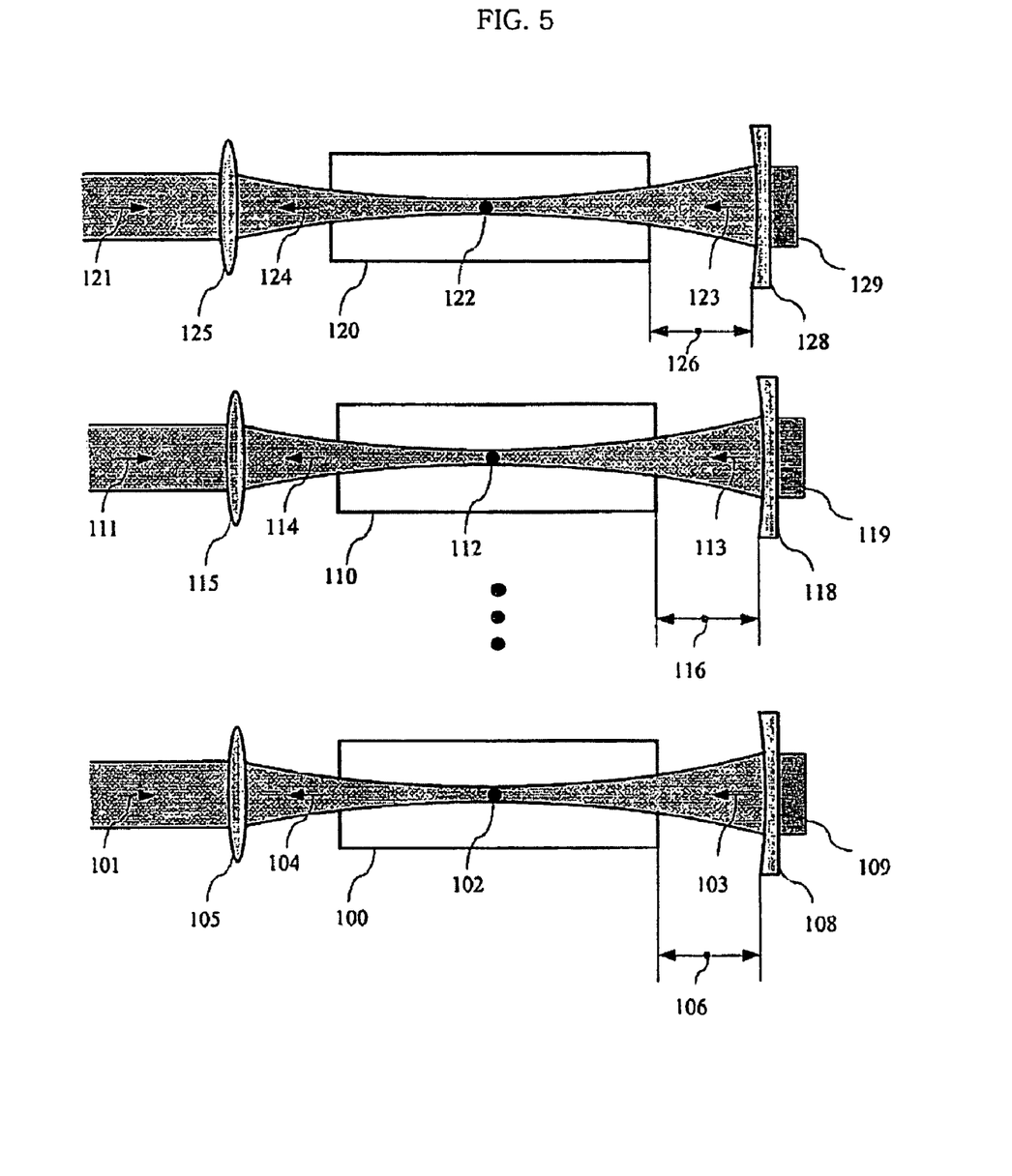
FIG. 5 is a schematic diagram showing an embodiment of controlling phases of laser beams through a stimulated Brillouin scattering and reflecting means according to the present invention.

FIG. 5 is a schematic diagram showing an embodiment of controlling phases of laser beams reflected from phase conjugate mirrors through a reflector and a fine driver according to the present invention. An apparatus for controlling the phases of the reflected laser beams includes focusing lenses, SBS-PCMs, the reflector, and a piezoelectric element serving as the fine driver. The focusing lenses are used to focus incident laser beams on the phase conjugate mirrors. A concave mirror is used as a focusing lens to focus a laser beam reflected to the reflector on a specific point of each phase conjugate mirror.

A procedure of controlling the phases of the reflected laser beams is explained below.

To split and amplify a single laser beam, the single laser beam is split into a plurality of incident laser beams 101, . . . , 111 and 121. The incident laser beams are focused on phase conjugate mirrors 100, . . . , 110 and 120 through focusing lenses 105, . . . , 115 and 125, respectively. Here, laser beams input before scattering occurs are passed through the phase conjugate mirrors and then reflected from reflecting concave mirrors 108, . . . , 118 and 128. These reflected laser beams 103, . . . , 113 and 123 are respectively focused on arbitrary points in the phase conjugate mirrors. When the incident laser beams focused by the focusing lenses meet the laser beams focused through the reflecting concave lenses at the arbitrary points 102, . . . , 112 and 122, standing waves are generated at the positions, as described above. The positions at which the standing waves are generated are fixed to arbitrary points in the phase conjugate mirrors 100, . . . , 110 and 120 so that the phases of the reflected laser beams 104, . . . , 114 and 124 are locked. However, the laser beams 104, . . . , 114 and 124 reflected according to the stimulated Brillouin scattering in the phase conjugate mirrors do not have the same phase because the positions of the standing waves in the phase conjugate mirrors are not identical. To control the reflected laser beams to have the same phase, the points on which the laser beams 103, . . . , 113 and 123 reflected from the reflecting concave mirrors 108, 118 and 128 are focused are controlled while finely moving the reflecting concave mirrors 108, . . . , 118 and 128 using the piezoelectric element.

Figure 6:
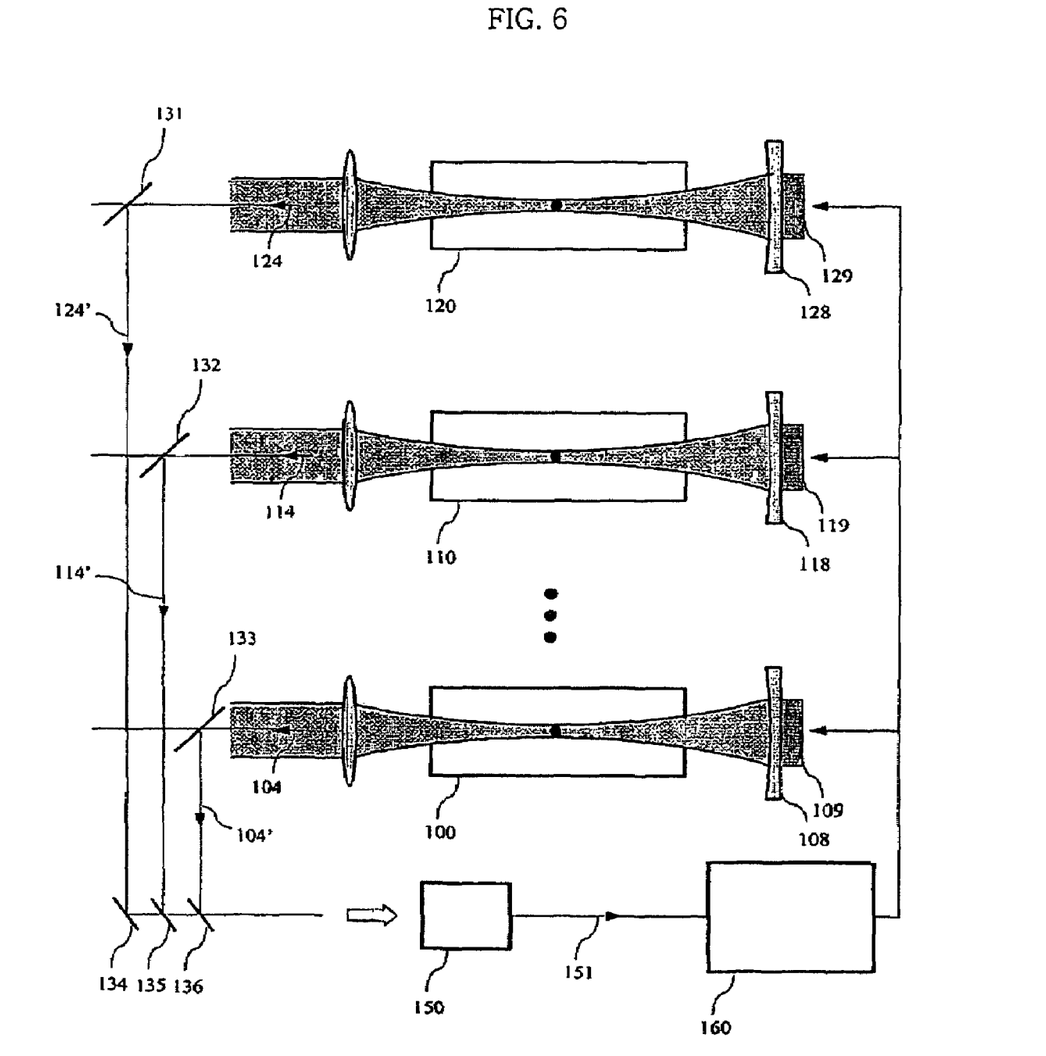
FIG. 6 is a schematic diagram showing a procedure of controlling a piezoelectric element through interference of laser beams reflected from a phase conjugate mirror.

FIG. 6 is a schematic diagram showing an apparatus for finely driving piezoelectric elements to control the positions of reflecting concave mirrors to thereby vary the phases of the reflected laser beams 104, . . . , 114 and 124. The apparatus includes light path converters, a light detector, a central controller including a piezoelectric driver, piezoelectric elements serving as a fine driver, and reflecting concave mirrors serving as reflectors. The light detector employs a CCD camera or a line camera.

A procedure of finely driving the piezoelectric elements to control the positions of the reflecting concave mirrors to thereby vary the phases of the reflected laser beams is explained below.

In the first step, laser beams 104', . . . , 114' and 124', which are respectively reflected from phase conjugate mirrors 100, . . . , 110 and 120, are input to the light detector 150 through light path converters 131, . . . , 132 and 133, respectively. In the second step, one 104' of the reflected laser beams as a reference laser beam interferes with another reflected laser beam 114'. In the third step, the interference result is detected and piezoelectric elements 109, . . . , 119 and 129 are finely driven to control the positions of reflectors 108, . . . , 118 and 128. In the fourth step, the reference laser beam 104' interferes with another reflected laser beam 124, and then the piezoelectric elements 109, . . . , 119 and 129 are finely driven by the central controller 160 to control the positions of the reflecting concave mirrors 108, . . . , 118 and 128 to make a phase difference between the two reflected laser beams 104' and 124' become "0". In the fifth step, the reference laser beam interferes with another reflected laser beam that does not interfere with the reference laser beam yet and the positions of the reflecting concave mirrors are controlled to make a phase difference between the interfering laser beams become "0". In the sixth step, the fifth step is repeated to allow the reference laser beam sequentially interferes with remaining reflected laser beams to make a phase difference between the interfering laser beams become "0".

Figure 7:
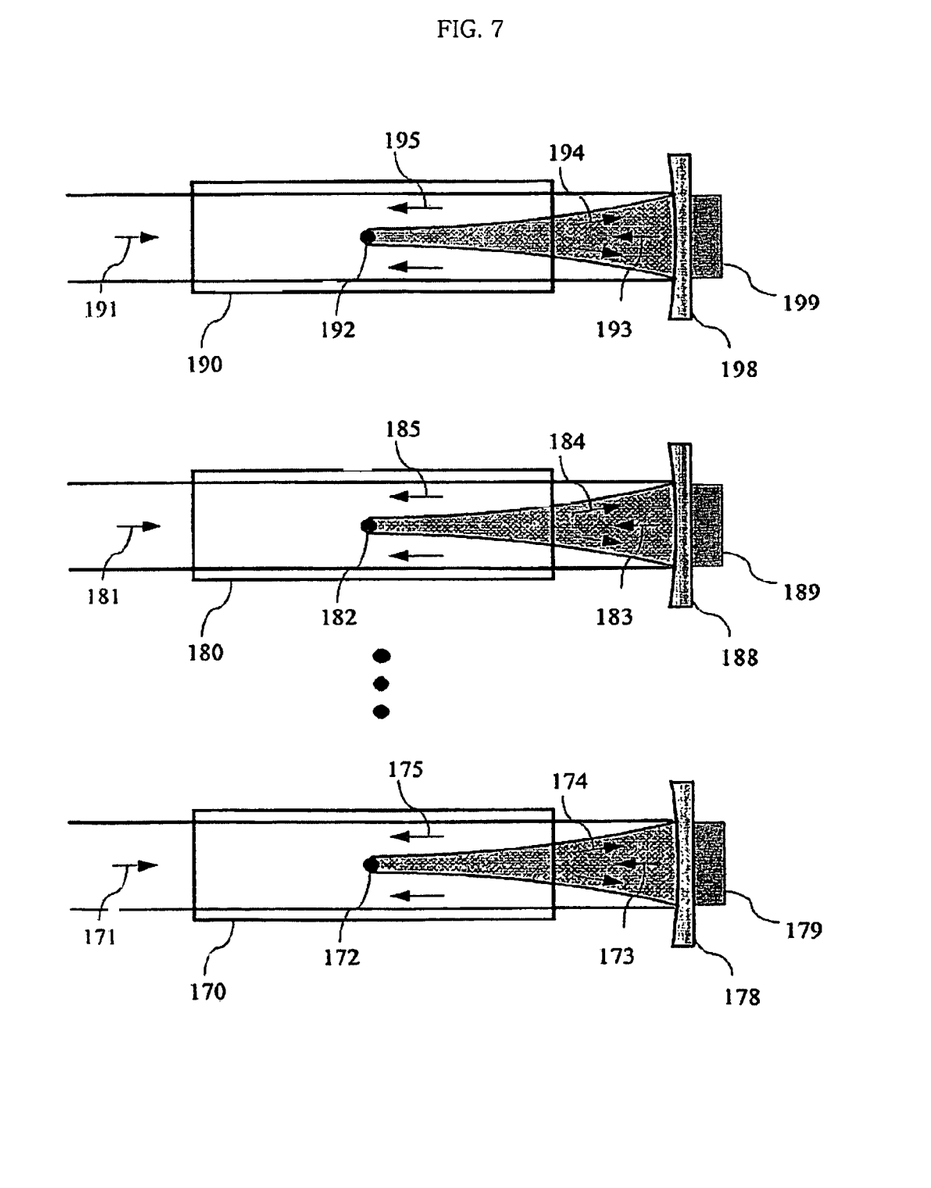
FIG. 7 is a schematic diagram showing another embodiment of controlling phases of laser beams through the stimulated Brillouin scattering and reflecting means according to the present invention.

FIG. 7 is a schematic diagram showing another embodiment of controlling the phases of the laser beams. The apparatus shown in FIG. 7 has the same configuration as that of the apparatus of FIG. 5 except that it does not have the focusing lenses 105, . . . , 115 and 125.

Referring to FIG. 7, a single laser beam is split into a plurality of incident laser beams 171, . . . , 181 and 191. The incident laser beams do not scatter in phase conjugate mirrors 170, . . . , 180 and 190 but transmit them, respectively, because the incident laser beams are not focused. The laser beams that have transmitted the phase conjugate mirrors are reflected from reflecting concave mirrors 178, . . . , 188 and 198 to be focused on arbitrary points 172, . . . , 182 and 192 in the phase conjugate mirrors, respectively. Standing waves are generated at the points 172, . . . , 182 and 192 on which the reflected laser beams are focused, as described above, to result in stimulated Brillouin scattering. The laser beams 174, . . . , 184 and 194 reflected according to the stimulated Brillouin scattering are propagated to the reflecting concave mirrors and become laser beams 175, . . . , 185 and 195 reflected from the reflecting concave mirrors 178, . . . , 188 and 198. The procedure of controlling the phases of the reflected laser beams is identical to the procedure shown in FIG. 6.

Figure 8:
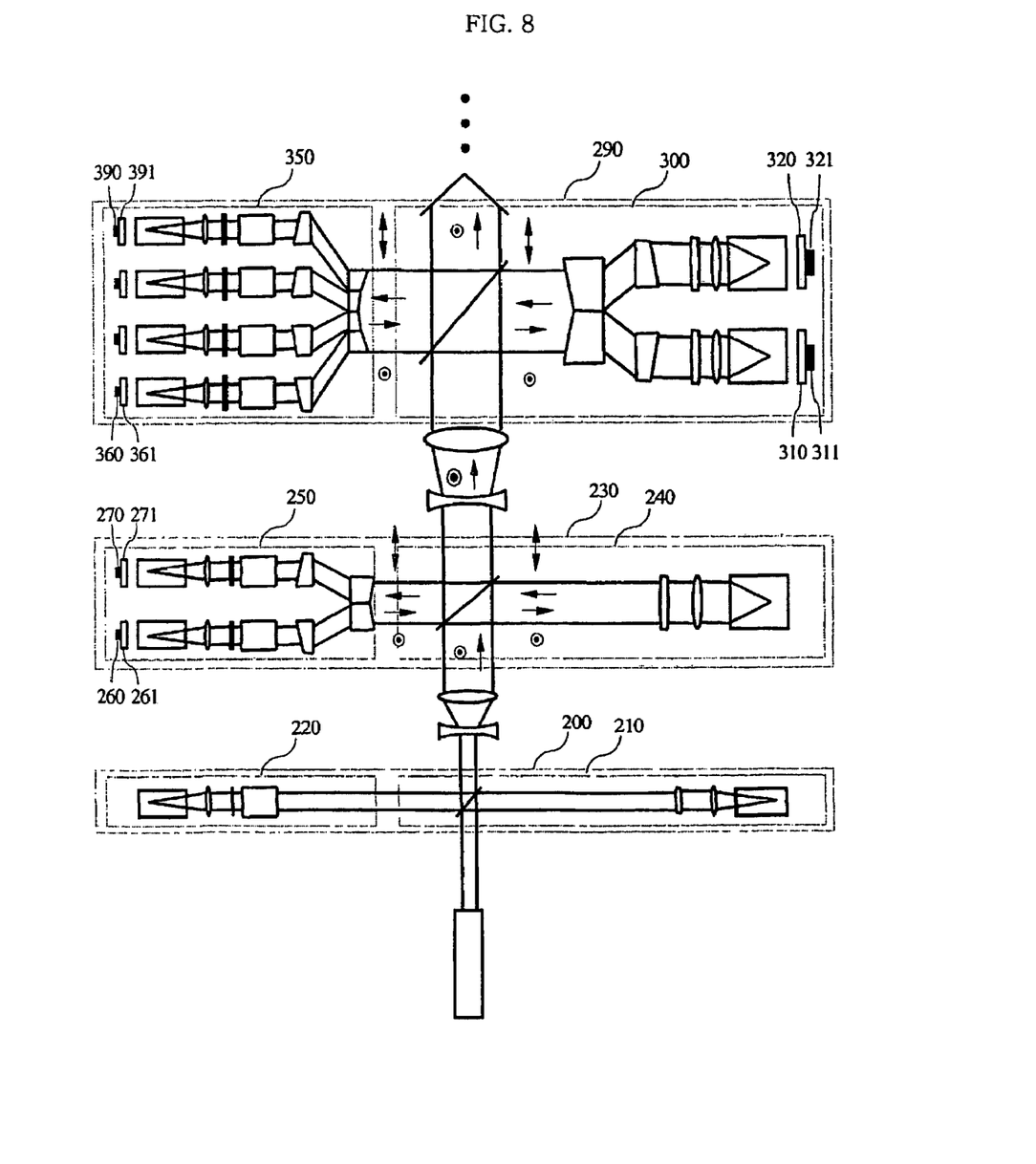
FIG. 8 is a schematic diagram showing the arrangement of phase controllers in a beam splitting amplifier.

FIG. 8 shows a part of controlling phases of laser beams reflected from phase conjugate mirrors in a beam splitting amplifier.

Referring to FIG. 8, a first light interrupter 210 and a first phase conjugate mirror amplifier 220 of a first amplification stage 200 and a second light interrupter 240 of a second amplification stage 230 are not require to control phases of reflected laser beams because they do not split a laser beam. However, a second phase conjugate mirror amplifier 250 of the second amplification stage 230 and a third light interrupter 300 of a third amplification stage 290 split the laser beam into two beams and a third phase conjugate mirror amplifier 350 of the third amplification stage 290 spit the laser beam into four beams. Thus, they need to control the phases of reflected laser beams. Accordingly, reflecting concave mirrors 260 and 270 and piezoelectric elements 261 and 271 serving as fine drivers are arranged behind the second phase conjugate mirror amplifier 250 of the second amplification stage. Reflecting concave mirrors 310 and 320 and piezoelectric elements 311 and 321 serving as fine drivers are located behind the third light interrupter 300 of the third amplification stage 290. In addition, Reflecting concave mirrors 360 and 390 and piezoelectric elements 361 and 391 serving as fine drivers are arranged behind the third phase conjugate mirror amplifier 350 of the third amplification stage. With this arrangement, the phases of the reflected laser beams are controlled.

INDUSTRIAL APPLICABILITY

According to the phase control method proposed by the present invention, a laser beam that is propagated in a medium is reflected and input to the medium again. Thus, there is no restriction on energy, distinguished from the conventional focusing overlapping. In addition, there is no need to separately generate a stokes wave, unlike the conventional stokes wave back seeding technique. Accordingly, the present invention is suitable for a beam splitting laser amplifier using an SBS-PCM because the apparatus of the invention has a simple structure and there is no restriction on the number of split laser beams.

Furthermore, the phase control method of the present invention controls phases of laser beams in a beam splitting amplification laser to make a phase difference between the laser beams "0". Thus, even the split laser beams can be processed as a single laser beam so that a laser beam having a high energy can be effectively obtained.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for self-phase control in an amplifier having a stimulated Brillouin scattering phase conjugate mirror, comprising:
   a laser beam generator for providing a laser beam to the amplifier;
   a plurality of phase conjugate mirror optical amplifiers for amplifying the laser beam; and
   a plurality of light interrupters that are respectively paired with the optical amplifiers and interrupt beams amplified by the optical amplifiers and reflected to the laser beam generator;
   wherein the optical amplifiers and the light interrupter split the laser beam into at least two beams and amplify or interrupt the beams, each of the optical amplifiers and light interrupter comprises: a beam splitter for splitting a laser beam into at least two laser beams; stimulated Brillouin scattering phase conjugate mirrors for reflecting the laser beams input from the beam splitter in a direction opposite to the direction of laser beams that are input according to stimulated Brillouin scattering; reflectors that are respectively located behind the phase conjugate mirrors and input beams that have passed through the phase conjugate mirrors to the phase conjugate mirrors again; and fine drivers for finely driving the reflectors, respectively, and the fine drivers are configured to control respective distances between the reflectors and phase conjugate mirrors so as to control positions at which stimulated Brillouin scattering occurs in the phase conjugate mirrors, thereby making a phase difference between laser beams reflected by the scattering "0".

2. The apparatus as claimed in claim 1, further comprising a focusing lens that is arranged at an arbitrary position placed before each of the stimulated Brillouin scattering phase conjugate mirrors, to focus the incident laser beams on an arbitrary point of each stimulated Brillouin scattering phase conjugate mirror, thereby making the phase difference between the laser beams reflected by the scattering "0".

3. The apparatus as claimed in claim 1, wherein the reflectors use concave lenses and the fine drivers use piezoelectric elements to make the phase difference between the laser beams reflected by the scattering "0".

* * * * *